US005410940A

United States Patent [19]

Havas

[11] Patent Number: 5,410,940

[45] Date of Patent: May 2, 1995

[54] APPARATUS AND METHOD FOR IDENTIFYING MUSICAL CHORDS

[75] Inventor: Janos Havas, Brisbane, Australia

[73] Assignee: Perfect Products Pty. Ltd., Capalaba, Australia

[21] Appl. No.: 961,693

[22] PCT Filed: Jul. 23, 1991

[86] PCT No.: PCT/AU91/00324

§ 371 Date: Mar. 1, 1993

§ 102(e) Date: Mar. 1, 1993

[87] PCT Pub. No.: WO91/02011

PCT Pub. Date: Feb. 6, 1992

[30] Foreign Application Priority Data

Jul. 24, 1990 [AU] Australia .............................. PK1325

[51] Int. Cl.6 ................................................ G09B 15/02

[52] U.S. Cl. .................................. 84/473; 84/485 SR

[58] Field of Search ........ 84/471 SR, 485 R, 485 SR, 84/473

[56] References Cited

U.S. PATENT DOCUMENTS

| | | | |
|---|---|---|---|
| 1,556,147 | 10/1925 | Johnson et al. | |
| 3,668,967 | 6/1972 | Malis | 84/471 |
| 3,712,167 | 1/1973 | Renault | 84/485 |
| 3,785,240 | 1/1974 | Hill | 84/485 |
| 4,069,737 | 1/1978 | Andersson | 84/485 |
| 5,029,507 | 7/1991 | Bezeau, Jr. | 84/485 SR |

FOREIGN PATENT DOCUMENTS

| | | |
|---|---|---|
| 4382289 | 3/1990 | Australia . |
| 0029463A1 | 6/1981 | European Pat. Off. . |
| 2336753 | 7/1977 | France . |
| 2119153A | 11/1983 | United Kingdom . |
| 121229/83 | 5/1984 | WIPO . |

*Primary Examiner*—Michael L. Gellner
*Assistant Examiner*—P. J. Stanzione
*Attorney, Agent, or Firm*—DeLio & Peterson

[57] ABSTRACT

A music chord indicating calculator assists in determining finger placement to play musical chords on a multi-stringed musical instrument containing a finger board. The device has an outer slide member and an inner base member which slides through the outer slide member. The slide member contains a number of columns of spaced viewing ports on both side faces. The inner base member has a number of columns of spaced indicia which are coded to correspond to various chords. A chord selector has one of the indicia on a column of indicia on the base member and can be viewed through a viewing port which has a chord identifying name associated with it. By sliding the base member and slide member relative to each other such that chord selector is viewed through a viewing port which identifies a chord by name, the finger placement of that chord can be viewed through the viewing ports by coding of the indicia on the base member.

23 Claims, 4 Drawing Sheets

APPARATUS AND METHOD FOR IDENTIFYING MUSICAL CHORDS

TECHNICAL FIELD

This invention is directed to an apparatus and method for indicating musical chords and is particularly directed to an apparatus and method for assisting in the determination of finger placement to play musical chords on a multi-stringed musical instrument containing a finger board.

BACKGROUND ART

Multi-stringed musical instruments containing a finger board include guitars, banjos, mandolins, ukuleles and the like.

Musical instruments having multiple strings allow chords to be played. To play a chord a player plucks or strums a number of strings together while adopting a particular finger placement on the finger board corresponding to the desired chord.

The finger board of such instruments usually comprise a long narrow neck divided into discrete areas or zones by a plurality of frets. The frets usually comprise ridges of metal, ivory or other material fixed across the finger board and slightly spaced from the musical strings.

To play a desired chord, a player adopts a particular finger position on the finger board which results in some or all of the musical strings being pressed against a fret. This causes the effective length of the string to vary thereby allowing a variety of musical notes to be formed.

As a guitar or like instrument usually comprises about 6 musical strings and about 10 frets along the finger board, it is apparent that many thousands of different chords can be played depending upon finger placement on the finger board.

To assist a player in identifying the chords, chord books are available listing chords according to their key. In practice, it is cumbersome and slow to leaf through such a chord book to find a desired chord.

A further disadvantage with chord books is that while it does assist in showing a player how to place his fingers on a finger board, it does not assist in allowing a player to determine a particular chord from a study of his finger placement. Under these circumstances, it is necessary to leaf through the entire chord book in the hope that an identical finger placement can be found to identify the particular chord.

Various attempts have been made to overcome the disadvantages inherent in a chord book.

Australian patent application 64762/74 is directed to a chord indicating device for pianos and similar keyboard instruments. The device comprises an elongate strip which rests on the black keys of a piano and is marked to indicate notes. This particular device is unsuitable for stringed instruments having a finger board.

Australian patent application 72424/74 discloses a calculator for determining musical chords. The calculator comprises a slide slidable in a guide member. While the calculator is useful to identify a chord, it does not identify finger placement on a finger board to allow a chord to be played.

Australian patent application 76558/74 discloses a musical teaching device. The device comprises a pair of circular disks which are movable relative to each other. Each disk carries music identifying indicia printed thereon. This device does not allow a ready identification of finger placement on a finger board to allow a chord to be played.

Australian patent application 21229/83 discloses a slide rule for stringed instruments. The rule consists of a base member and a number of masks slidable in the base member. The device requires the use of several different masks depending on the scale type with different masks being required for major and minor scales. The arrangement is cumbersome for a player wishing to readily determine chords of different scales as the player is required to remove the existing mask from the base member and insert a second mask. By having the slide rule comprising a number of separate integers, there is always the possibility of unused masks being lost or mislaid. The rule is also cumbersome to use in that it requires a system of twelve different colours by which to distinguish different chords.

Australian patent application 28219/84 discloses a musical scale which allows the notes of a particular chord to be identified but does not readily identify finger placement of a finger board of a musical instrument to allow a chord to be played.

Australian patent application 43822/89 discloses a musical scale slide rule for stringed instruments. The device comprises a base member and at least four separate slide members which are slidable along different portions of the base member. The base member has representations of at least four finger boards and the four separate slide members slide into respective slots in the base member. The use of four separate slide members makes the resulting device difficult to work and difficult to understand.

DISCLOSURE OF THE INVENTION

It is an object of the invention to provide an apparatus and method which may at least partially overcome the abovementioned disadvantages or provide the public with a useful choice.

In one form, the invention resides in an apparatus for determining finger placement on a finger board to play musical chords on a multi-stringed musical instrument containing a finger board, the apparatus comprising an inner base member having a number of columns of spaced indicia, the number of columns corresponding at least to the number of strings on the musical instrument, an outer slide member having a number of columns of spaced viewing ports, the number of columns corresponding to the number of columns of spaced indicia on the base member, said base member and slide member being slidably movable relative to each other, and a chord selector to allow a particular chord to be selected by said apparatus, the construction and arrangement being such that upon selection of a desired chord by said chord selector, said base member and said slide member are moved relative to each other to a particular position whereby the finger placement on the finger board to play the selected chord can be determined by the indicia visible through said viewing ports.

In another form, the invention resides in a method for identifying an playing chords on a multi-stringed instrument of the type having a finger board, said method comprising sliding an inner base member having a number of columns of spaced indicia, the number of columns corresponding at least to the number of strings on the instrument along an outer sleeve member having a number of columns of spaced viewing ports, the number of columns corresponding to the number of columns of spaced indicia on the base member, and utilising a chord selector to allow a particular chord to be selected, whereby upon selection of a desired chord by the chord selector, the base member and the slide member are moved relative to each other to a particular position whereby the finger placement on the finger board to play the selected chord can be determined by the indicia visible through said viewing ports.

The base member may comprise a substantially planar sheet or plate material. The sheet or plate material may have an elongate substantially rectangular configuration. The sheet or plate material may be formed from paper, cardboard, plastics, metal, wood or other suitable material.

The slide member may comprise an elongate housing. The housing may be flattened to define a pair of substantially planar side walls.

The slide member may be dimensioned to allow the base member to be slidably received within the slide member. The slide member may be open on one or both end faces.

The slide member may comprise any suitable materials such as paper, cardboard, plastics, metal or wood.

The viewing ports on said slide member may be located on one or both of the opposed side walls. The viewing ports may comprise openings extending through the or each side wall. Suitably, the viewing ports are evenly spaced along each column. Adjacent columns may be positioned such that viewing ports of adjacent columns are in linear alignment.

The slide member may include a head portion which is associated with the chord selector.

The base member may include columns of spaced indicia on one or both faces of the base member.

For guitars having six strings, the base member may comprise six columns of spaced indicia. The columns may be evenly spaced apart and the spacing between indicia may also be substantially equal.

The spaced indicia may extend substantially along the base member. The indicia may comprise a selection of distinguishing marks. The marks may include geometric shapes, letters, numbers and/or symbols. The marks may be colour coded.

Groups of indicia may function to identify the notes of a particular chord. The indicia may identify major and minor chords, suspended augmented or diminished chords. The columns of indicia on the base member and the columns of viewing ports on the sleeve member may be aligned. Spacing between adjacent indicia on the base member and adjacent viewing ports on the sleeve member are preferably substantially equal.

In this manner, by relative movement of the base member and sleeve member, differing arrays or groups of indicia may be viewed through the viewing ports, corresponding to different chords.

The indicia may be selectively colour coded whereby finger placement may be guided by following the colour coding.

The chord selector may comprise an indicator. The indicator may be formed with or to the base member. The indicator may comprise a coded indicia in one of the columns of the base member. The slide member may be provided with chord referencing letters and a particular chord may be selected by movement of the indicator to adjacent a desired chord referencing letter.

BRIEF DESCRIPTION OF THE DRAWINGS

The invention will be more fully understood by reference to the following description of a preferred embodiment thereof in which.

BEST MODE FOR CARRYING OUT THE INVENTION

Figure 1:
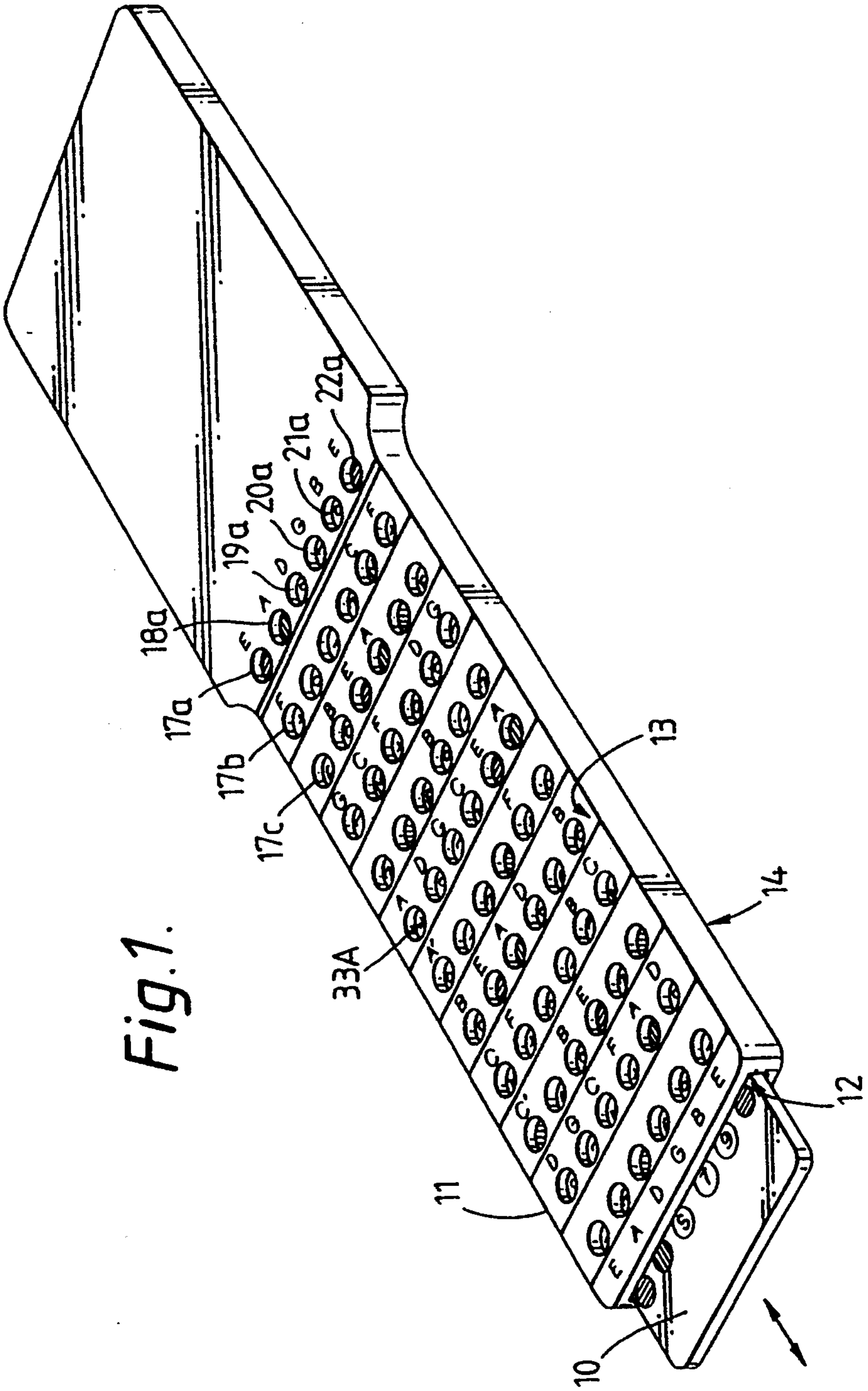
FIG. 1 is a perspective view of an apparatus according to an embodiment of the invention.

In FIG. 1 there is disclosed an apparatus according to an embodiment of the invention. The apparatus comprises a base member 10 which is slidable within a slide member 11. Member 10 can slide in member 11 through inlet 12.

Slide member 11 is formed with a pair of opposed parallel side walls 13 and 14 defining a slot therebetween through which member 10 can slide.

Base member 10 is provided with columns of indicia which will be described in more detail below.

In FIG. 1, side wall 13 is provided with six columns of spaced viewing ports in the form of circular openings *17a–22a*. Columns *17a–22a* are evenly spaced across wall 13 and correspond to the number of strings of a six stringed guitar. Similar columns are present on the other side wall 14.

Each column comprises twelve equally spaced circular openings (*17a*, *17b*, *17c* etc) in linear alignment. Openings *17a*, *17b* etc correspond to finger positions behind the frets of an instrument finger board.

For instance, openings *17a–22a* correspond to "open" strings. Opening *17d* will correspond to placing a finger behind the third fret of the outermost musical string of an instrument finger board.

The precise positioning of a finger is determined by viewing the indicia on the base member through the openings on side walls 12 and 13 as will be more fully discussed below.

Figure 2A:
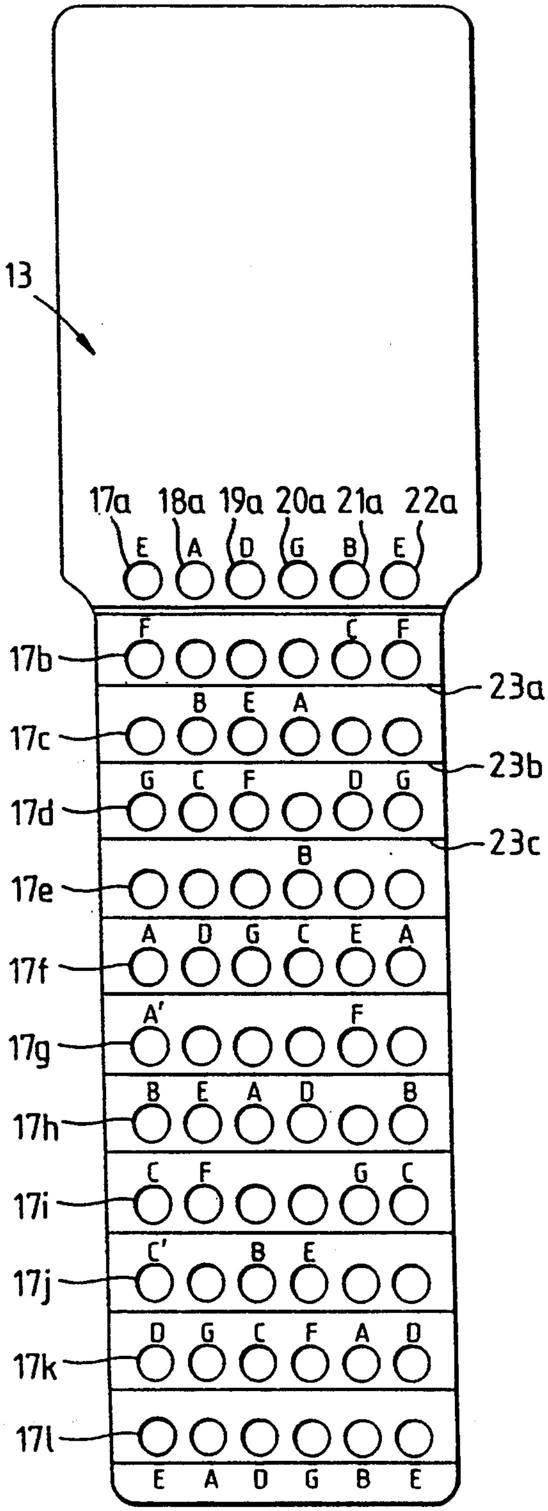
FIGS. 2A and 2B disclose front and rear plan views of an outer slide member according to an embodiment of the invention.
Figure 2B:
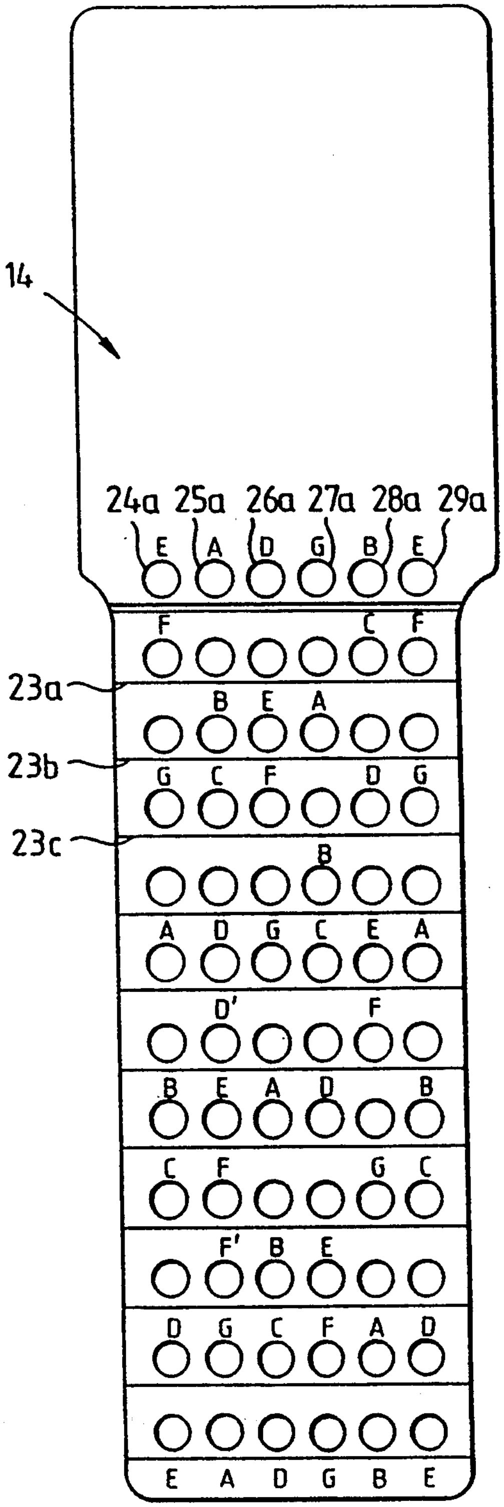

FIGS. 2A and 2B are plan views of side walls 13 and 14 and include indicia.

In FIGS. 2A and 2B walls 13 and 14 are shown having six equally spaced columns or openings *17a–22a* and *24a–29a*. This embodiment is directed to an apparatus suitable for a guitar as the uppermost openings of each column identify the particular string. Thus for guitars the strings are E, A, D, G, B and E.

The left hand column *17a* of side wall 13 contains further identifying indicia above openings *17f–17k*. These identifying indicia function to aid in the selection of a desired chord as will be discussed in greater detail below. These indicia are colour coded differently from the remaining indicia on side wall 13.

In FIG. 2B, openings *25g–25l* are also provided with additional identifying indicia which also function to aid in the selection of a desired chord as will be discussed in more detail below. These indicia are also colour coded differently from the remaining indicia on side wall 14.

In each of side walls 13 and 14, lines 23*a*, 23*b* etc denote imaginary frets.

Figure 3A:
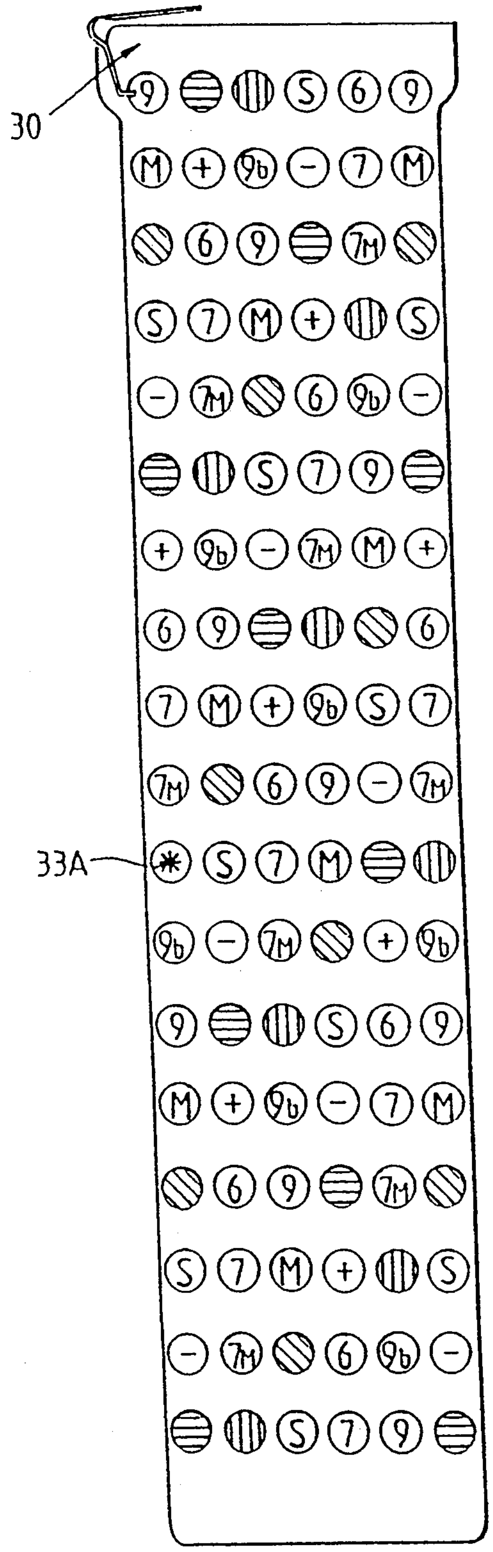
FIGS. 3A and 3B disclose front and rear faces of an inner base member according to an embodiment of the invention and including indicia.
Figure 3B:
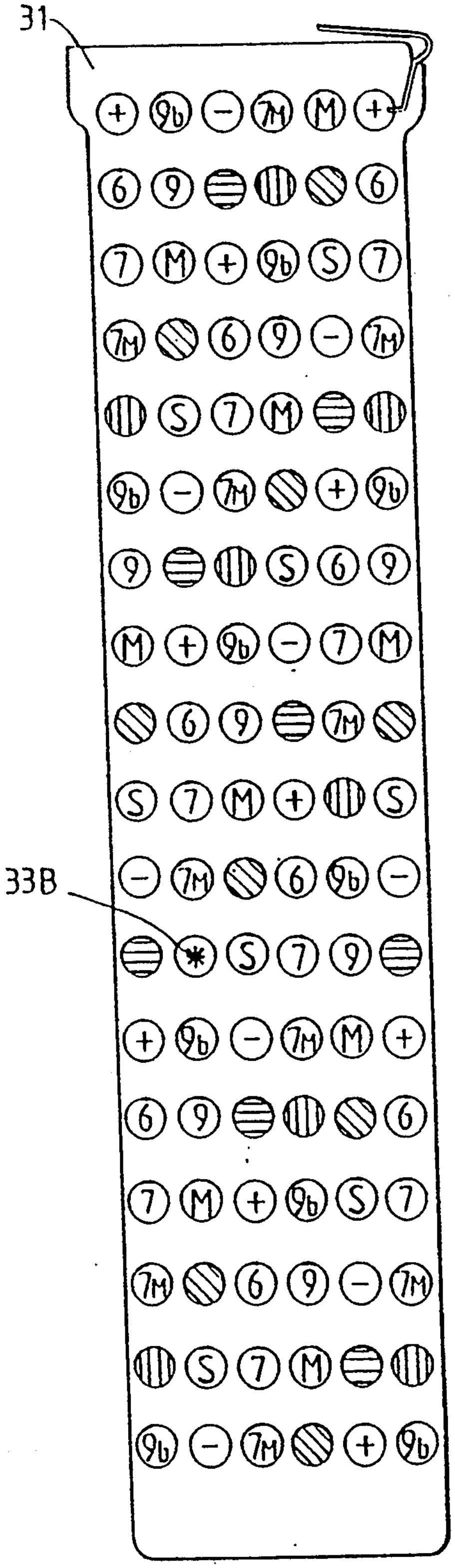

FIGS. 3*a* and 3*d* disclose a front face 30 and rear face 31 of a base member according to an embodiment. Front face 30, in use, is located behind side wall 13 of side member 11 while rear face 31 is located, in use, behind side wall 14 of slide member 11.

Each of faces 30 and 31 of base member 10 include 6 columns of longitudinally spaced indicia.

The indicia are coded as follows (under Heraldic convention to identify colours):

⦶-circle colour coded red
⊜-circle colour coded blue
⦸-circle colour coded green
m-minor-colour coded green
s-suspended-colour coded green
—-diminished-colour coded blue
+-augmented-colour coded blue
6, 7, $7^m$, 9, $9^b$-additional fourth and fifth sounds-colour coded black
*-chord selector indicium-colour coded pink It should be appreciated however that the above indicia have been chosen merely for convenience and many other variation can be used.

A musical chord usually consists of a basic three note chord optionally containing a fourth or fifth note. The basic three notes comprise a "key" note, a "character" note and a "wideness" note.

The "key" note is named by its position in the musical octave and in the embodiment of this invention is identified as the circle colour coded red.

The "character" note can be of three types—major, minor (m) or suspended (s) and in the embodiment is identified as indicia colour coded green.

The third note of a musical chord or "wideness" note can also be of three types—normal, diminished (−) or augmented (+) and in the embodiment is colour coded blue. Each three note chord is built up from a combination of a key note, one of the "character" notes and one of the "wideness" notes.

Thus, by placing a finger on a finger board corresponding to a red, green and blue indicium, a desired chord can be played. The green indicium can be varied on a string to play a major (green circle) minor (green coloured m) or suspended (green coloured 5) chord. also the blue indicium can be varied on a string to play a normal (blue circle) diminished (blue "−" sign) and augmented (blue "+" sign) chord.

If a chord comprises an optional fourth or fifth note, these are identified in the embodiment by indicia 6, 7, $7^m$, 9, $9^h$.

All the abovementioned indicia are provided in the columns on faces 30 and 31 of base member 10 according to the embodiment.

Figure 4A:
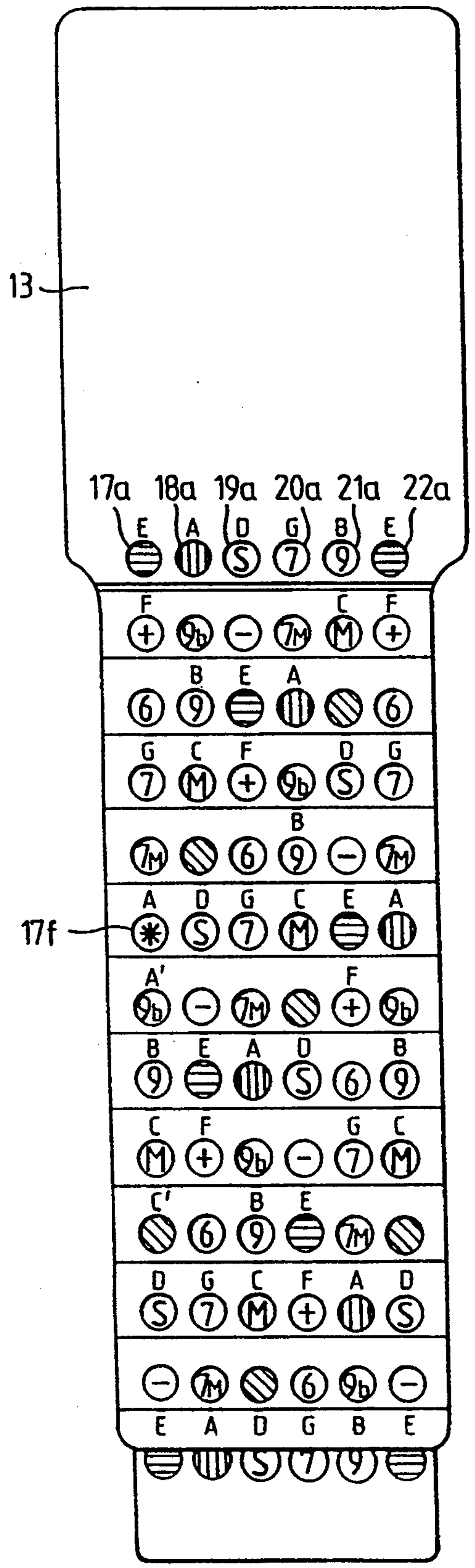
FIG. 4A is a plan view of the apparatus according to an embodiment of the invention identifying an A chord.
Figure 4B:
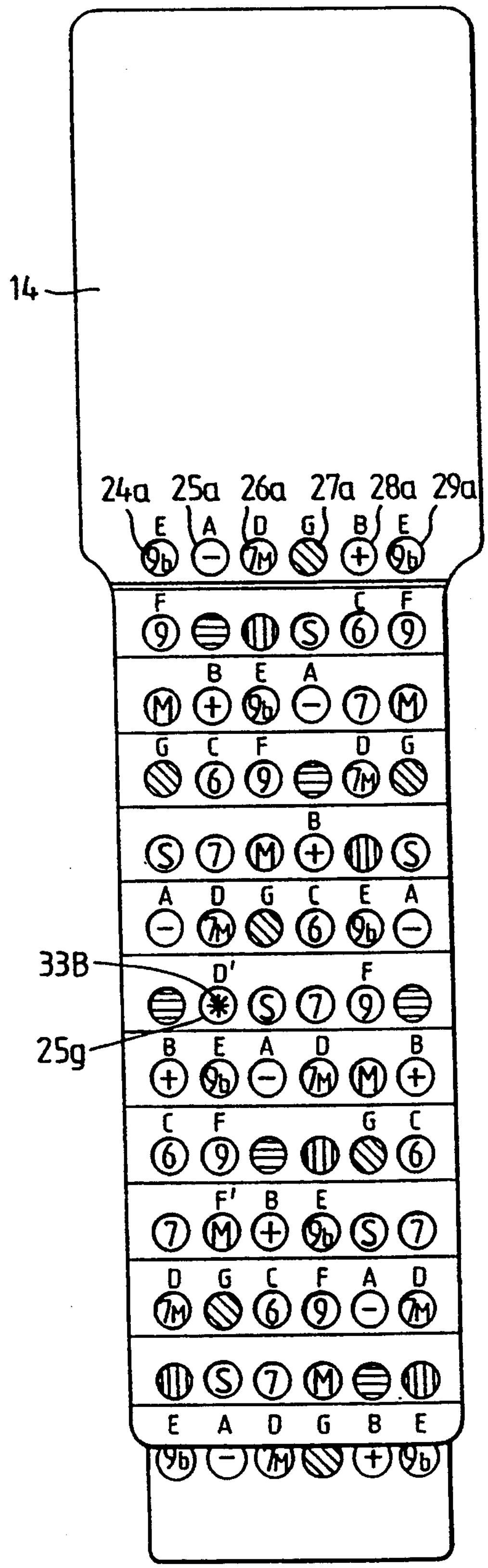
FIG. 4B is a plan view of an apparatus according to an embodiment of the invention identifying a D′ chord.

FIGS. 4A and 4B show the apparatus according to an embodiment of the invention, in use, to depict two exemplary chords being "A" in FIG. 4A and "D'" in FIG. 4B.

The selection of a desired chord is made by using the chord selector 33A, 33B. By sliding base member 10 into slide 11 chord selector 33A (or 33B) can be viewed through any of openings 17*f*–17*k* (or 25*g*–25*l*). Each of these openings is identified by a letter identifying the chord. Thus opening 17*f* is identified by the letter A indicating an A chord when chord selector 33A is positioned to be viewed through opening 17*f*. Similarly, opening 17*i* is identified by the letter C indicating a C chord. To select a chord, base member 10 is slid in slide 11 until selector 33A (or 33B) is viewed through the desired opening.

Thus, in FIG. 4A, chord selector 33A has been moved to be viewed through openings 17*f* which indicates an A chord. In FIG. 4B, chord selector 33B has been moved to be viewed through openings 25*g* which indicates a D' chord.

Once the chord selection has been achieved, the colour coding of the indicia on base member 10 will identify the finger placements on the finger board according to the following rules:

Any full circles in the upper most row of openings 17*a*, 18*a*, 19*a* etc identifies these strings as to be strummed or plucked in the "open" form.

For the remaining strings, fingers should be placed to cover a blue, red or green uppermost full circle.

Thus, in FIG. 4A, the A chord can be played by positioning fingers on a finger board in the following manner. String E is played open, string A is played open, string D is played by positioning a finger on a fingerboard at a position corresponding to the blue circle (ie. opening 19C), string G is played by positioning a finger on a fingerboard at a position corresponding to the red circle (ie. over opening 20*c*), string B is played by positioning a finger on a fingerboard at a position corresponding to the green circle (ie. opening 21*c*) and string E is played open.

In each case, it is necessary that each of the colours blue, red and green have a corresponding finger placement.

FIG. 4A also discloses that various other finger arrangements can be used further up the fret board to play the chord A. While the above discussion has been directed to a basic major chord, the apparatus according to the invention identifies finger positions for minor, suspended, augmented, diminuished etc chords. To achieve this, we simply use the green minor, s or the blue +, − instead of the full green or full blue circles.

Thus, in FIG. 4A, A minor can be played by fingering the green m in opening 216 instead of 21*c* for the major.

FIG. 4B discloses how the apparatus can be used to identify the finger positioning for a D' chord. As shown in FIG. 4B, chord selector 33B has been moved to overlie opening 25*g* thereby selecting the D chord. Using the rules described above, string E (corresponding to column 29*a*) is played by positioning a finger on a finger board at a position corresponding to the green circle (i.e., opening 29*d*). String B is played by positioning a finger on a finger board at a position corresponding to the red circle (i.e., over opening 28*e*) and string G is played by positioning a finger on a finger board at a position corresponding to the blue circle (i.e., opening 27*d*).

Other chords can be played depending on the positioning of chord selector 33*a* and 33*b*. It is also apparent from the embodiments that various chords can be played up or down the fret board and the apparatus is a convenient method by which these chords can be easily identified for the purposes of playing.

Although the apparatus is simple to use, a minor disadvantage is that all the viewing points are always open and all the indicia is displayed. This may cause some initial confusion although once a player becomes familiar with the device the confusion disappears.

However, to overcome this slight disadvantage it is within the scope of the invention to provide masks to cover the viewing points which do not contain desired information. The masks can slide within or around the apparatus.

Each mask contains spaced viewing ports corresponding only to a desired chord and may also contain further indicia.

Several masks may be used to selectively cover viewing ports not associated with a particular chord.

Thus, if an A minor chord is desired, a "minor" designating mask can be positioned to cover all the viewing ports not associated with a minor chord.

The only viewing ports which will be open will correspond to the A minor chord making finger positioning easier.

In this way, it is appreciated that the apparatus according to the invention provides a simple device to allow almost every available type of chord to be readily determined and also provides a ready indication of finger positioning on the finger board of a stringed instrument. The apparatus does away with the requirement for a number of separate base members or masks.

A further advantage of the apparatus is that once a particular finger pattern is found on the finger board, its particular identifying chord can be conveniently found by moving base member 10 through slide member 11 until a particular finger positioning is also identified by the apparatus. The chord identifying indicia 33 or lug 32 will then identify the name of the chord.

It should be appreciated that various other changes and modifications can be made to be embodiment described without departing from the spirit and scope of the invention as defined in the claims.

I claim:

1. An apparatus for determining finger placement on a finger board to play musical chords on a multi-stringed musical instrument containing a finger board, the apparatus comprising an inner base member having a number of columns of spaced indicia, the number of columns corresponding at least to the number of strings on the musical instrument, an outer slide member comprising a pair of opposed side walls defining a slot therebetween having six columns of spaced viewing ports, located on both side walls of the slide member wherein each said column comprises twelve spaced viewing ports in linear alignment, the number of columns corresponding to the number of columns of spaced indicia on the base member, said base member and slide member being slidably movable relative to each other, within said slot, and a chord selector to allow a particular chord to be selected by said apparatus, the construction and arrangement being such that upon selection of a desired chord by said chord selector, said base member and said slide member are moved relative to each other to a particularly position whereby the finger placement on the finger board to play the selected chord can be determined by the indicia visible through said viewing ports.

2. An apparatus for determining finger placement on a finger board to play musical chords on a multi-stringed musical instrument containing a finger board, the apparatus comprising an inner base member comprises a substantially flat sheet having opposed faces, each said face having six columns of spaced indicia and wherein each column comprises eighteen spaced separate indicia in linear alignment, the number of columns corresponding at least to the number of strings on the musical instrument, an outer slide member having a number of columns of spaced viewing ports, the number of columns corresponding to the number of columns of spaced indicia on the base member, said base member and slide member being slidably movable relative to each other, and a chord selector to allow a particular chord to be selected by said apparatus, the construction and arrangement being such that upon election of a desired chord by said chord selector, said base member and said slide member are moved relative to each other to a particular position whereby the finger placement on the finger board to play the selected chord can be determined by the indicia visible through said viewing ports said indicia coded to define a key note, a character note and a wideness note.

3. The apparatus as claimed in claim 2 wherein said character note is coded to separately define a major note, a minor note and a suspended note.

4. The apparatus as claimed in claim 2 wherein said wideness note is coded to separately define a normal note, a diminished note and an augmented note.

5. The apparatus as claimed in claim 2 wherein the said indicia further code for the notes 6, 7, $\mathbf{7^m}$, 9 and $\mathbf{9^b}$.

6. An apparatus for determining finger placement on a finger board to play musical chords on a multi-stringed musical instrument containing a finger board, the apparatus comprising:

an inner base member comprises a substantially flat sheet having opposed faces each said face having a number of columns of spaced indicia, the number of columns corresponding at least to the number of strings on the musical instrument, an outer slide member having a number of columns of spaced viewing ports, the number of columns corresponding to the number of columns of spaced indicia on the base member, said base member and slide member being slidably movable relative to each other, and a chord selector comprises an indicium on both of the faces of the base member to allow a particular chord to be selected by said apparatus, the construction and arrangement being such that upon selection of a desired chord by said chord selector, said base member and said slide member are moved relative to each other to a particular position whereby the finger placement on the finger board to play the selected chord can be determined by the indicia visible through said viewing ports.

7. An apparatus for determining finger placement on a finger board to play musical chords on a multi-stringed musical instrument containing a finger board, the apparatus comprising:

an inner base member comprises a substantially flat sheet having opposed faces each said face having a number of columns of spaced indicia, the number of columns corresponding at least to the number of strings on the musical instrument, an outer slide member having a number of columns of spaced viewing ports, the number of columns corresponding to the number of columns of spaced indicia on the base member, said base member and slide member being slidably movable relative to each other, and a chord selector comprises a coded indicium in one of the columns of spaced indicia on the base member to allow a particular chord to be selected by said apparatus, the construction and arrangement being such that upon selection of a desired chord by said chord selector, said base member and said slide member are moved relative to each other to a particular position whereby the finger placement on the finger board to play the selected chord can be determined by the indicia visible through said viewing ports.

8. An apparatus for determining finger placement on a finger board to play musical chords on a multi-stringed musical instrument containing a finger board, the apparatus comprising:

an inner base member comprises a substantially flat sheet having opposed faces each said face having a number of columns of spaced indicia, the number of columns corresponding at least to the number of strings on the musical instrument, an outer slide member having a number of columns of spaced viewing ports wherein said slide member includes chord indentifying indicia associated with one or more of the viewing ports to identify a chord name upon location of the chord selector to be viewed through one of said one or more viewing ports, the number of columns corresponding to the number of columns of spaced indicia on the base member, said base member and slide member being slidably movable relative to each other, and a chord selector to allow a particular chord to be selected by said apparatus, the construction and arrangement being such that upon selection of a desired chord by said chord selector, said base member and said slide member are moved relative to each other to a particular position whereby the finger placement on the finger board to play the selected chord can be determined by the indicia visible through said viewing ports.

9. An apparatus for determining finger placement on a finger board to play musical chords on a multi-stringed musical instrument containing a finger board, the apparatus comprising:

an inner base member having a number of columns of spaced indicia, the number of columns corresponding at least to the number of strings on the musical instrument, an outer slide member having a number of columns of spaced viewing ports, the number of columns corresponding to the number of columns of spaced indicia on the base member, said base member and slide member being slidably movable relative to each other, and a chord selector to allow a particular chord to be selected by said apparatus, the construction and arrangement being such that upon selection of a desired chord by said chord selector, said base member and said slide member are moved relative to each other to a particularly position whereby the finger placement on the finger board to play the selected chord can be determined by the indicia visible through said viewing ports characterized in that the indicia are separately coded to define a key note, a character note and a wideness note.

10. The apparatus as claimed 9, wherein said character note is coded to separately define a major note, a minor note and a suspended note.

11. The apparatus as claimed in claim 10 wherein the wideness note is coded to separately define a normal note, a diminished note and an augmented note.

12. The apparatus as claimed in claim 1, wherein the said indicia further code for the notes 6, 7, $\mathbf{7^m}$, 9 and $\mathbf{9^b}$.

13. The apparatus as claimed in claim 12, wherein said chord selector comprises an indicium on one of the faces of the base member.

14. The apparatus as claimed in claim 13, wherein said chord selector comprises an indicium on both of the faces of the base member.

15. The apparatus as claimed in claim 13, wherein said chord selector comprises a coded indicium in one of the columns of spaced indicia on the base member.

16. The apparatus as claimed in claim 13, wherein said slide member includes chord identifying indicia associated with one or more of the viewing ports to identify a chord name upon location of the chord selector to be viewed through one of said one or more viewing ports.

17. The apparatus as claimed in claim 12, wherein said outer slide member comprises a pair if opposed side walls defining a slot therebetween, said base member being slidably movable within said slot.

18. The apparatus as claimed in claim 17, wherein said viewing ports are located on both side walls of the slide member.

19. The apparatus as claimed in claim 18, comprising six columns of viewing ports on each side wall of said slide member.

20. The apparatus as claimed in claim 19, wherein each said column comprises twelve spaced viewing ports in linear alignment.

21. The apparatus as claimed in claim 20, wherein said inner base member comprises a substantially flat sheet having opposed faces each said face containing columns of spaced indicia.

22. The apparatus as claimed in claim 21, wherein each said opposed face includes six columns of spaced indicia.

23. The apparatus as claimed in claim 22, wherein each said column comprises eighteen spaced separate indicia in linear alignment.

* * * * *